United States Patent [19]

Schumacher

[11] 4,088,542

[45] May 9, 1978

[54] METHOD OF AND DEVICE FOR SPONTANEOUSLY DISTILLING OFF SECONDARY SUBSTANCES ESPECIALLY FROM OILY LIQUIDS

[76] Inventor: Heinz Schumacher, Hoperfeld 26, D-2050, Hamburg 80, Germany

[21] Appl. No.: 693,651

[22] Filed: Jun. 7, 1976

[30] Foreign Application Priority Data

Jun. 11, 1975 Germany ............................ 2525976

[51] Int. Cl.² ...................... B01D 3/06; B01D 3/38; C11B 3/14
[52] U.S. Cl. ...................................... 203/88; 203/92; 203/DIG. 14; 202/177; 202/205; 202/234; 260/428
[58] Field of Search .............................. 203/88, 91–93, 203/95–97, DIG. 14, 49, 26, 24, 76, 79, 83, 85; 202/205, 234, 177; 260/428

[56] References Cited

U.S. PATENT DOCUMENTS

| 2,224,926 | 12/1940 | Potts et al. | 203/92 |
| 2,478,089 | 8/1949 | Clayton | 203/92 |
| 3,470,070 | 9/1969 | Heckart | 203/88 |

FOREIGN PATENT DOCUMENTS

| 457,624 | 12/1936 | United Kingdom | 203/88 |

Primary Examiner—Wilbur L. Bascomb, Jr.
Attorney, Agent, or Firm—J. Rodman Steele, Jr.

[57] ABSTRACT

Unwanted contaminants or by-products of oily streams can be removed by distillation at reduced pressure and elevated temperatures using an ancillary distilling agent which lowers the boiling temperatures of the impurities. The efficiency of such removal is enhanced by the formation of a true solution of the ancillary agent in the oily stream at the molecular level. To bring about this solution, the ancillary agent in the superheated gaseous state is brought into intimate contact with the oily stream in a mixing vessel or contactor at substantially equal pressures but at slightly differing temperatures. The oil temperature is such as to cause condensation of the ancillary agent, but not to significantly cool the oil.

5 Claims, 1 Drawing Figure

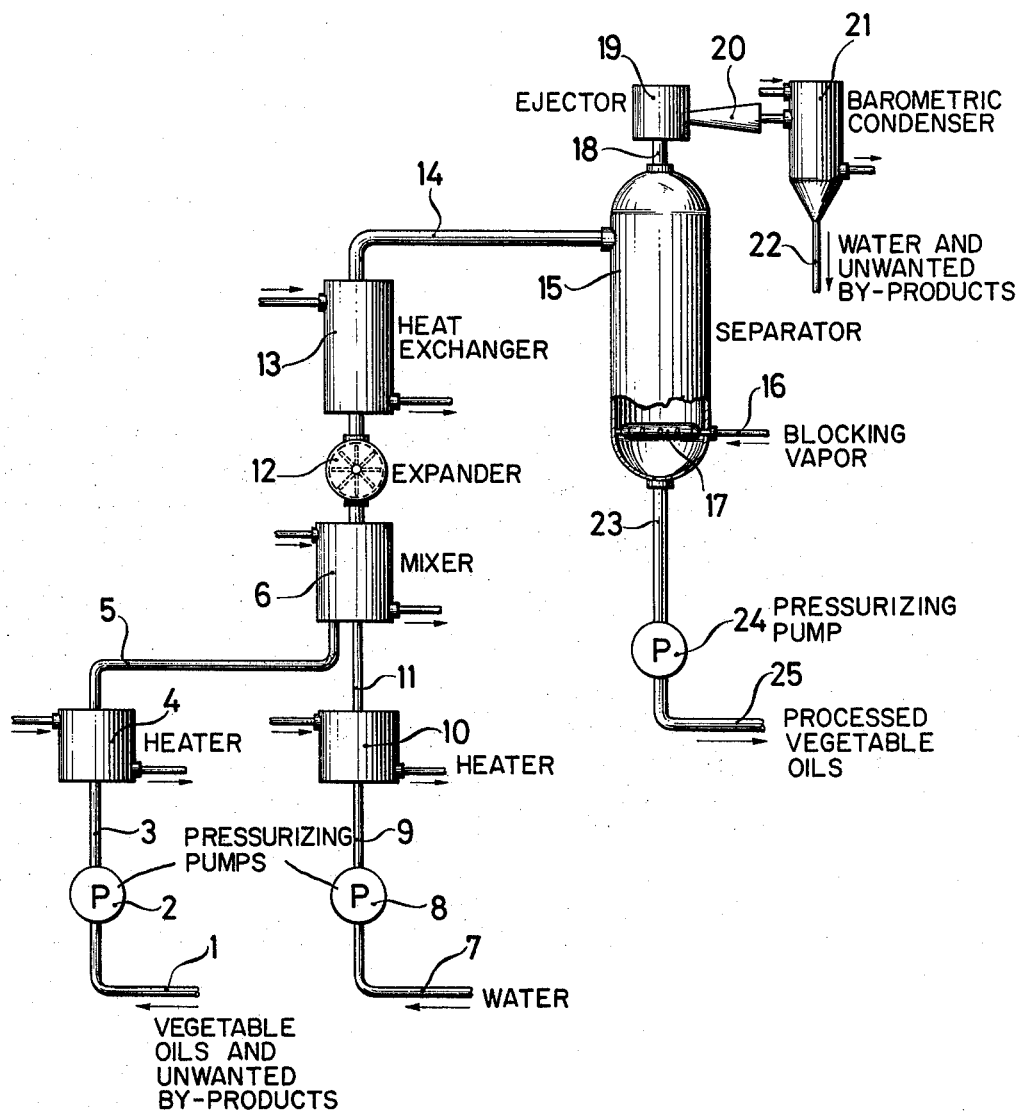

METHOD OF AND DEVICE FOR SPONTANEOUSLY DISTILLING OFF SECONDARY SUBSTANCES ESPECIALLY FROM OILY LIQUIDS

This invention relates to a method of and a device for spontaneously distilling off, i.e. separating or stripping, contaminants or by products especially from oily liquids.

This invention particularly relates to an improvement in the invention described in German Patent Application No. P 24 33 733.5, where it was assumed to be already known that the material to be treated, namely the oily liquids, i.e. oils or fats, can absorb water in true solution, i.e. in molecular distribution, in amounts of up to 4 to 5% by weight at high temperatures, e.g. 250° C.

While it was previously only known, as described for example in German specification No. 2,442,217, to use a stripping gas which must always remain in gaseous form even in the contact vessel, in order to effect fractional separation of the secondary substances from the oily liquids as spontaneously as possible, the above-mentioned German Patent Application No. P 24 33 733.5 described contacting in the mixer or contact vessel where both the ancillary distillation agent and the material to be treated are, contrary to the previous state of the art, present in the liquid phase, although under high pressures.

Thus it has been established that an improved separation of the secondary substances from oil is possible in this way, that the times of passage can be considerably reduced, and in consequence thereof the cost of the apparatus for carrying out the method can be reduced.

The shortening of the time of passage appears to be the most important improvement, since the material to be treated, especially in the case of vegetable oils, is usually very sensitive in appearance and/or taste to the period during which it has been treated at the aforesaid high temperatures.

An object of the present invention is, therefore, to reduce still further the length of time at which the treated materials are subjected to the high temperature, since effective liberation of the secondary substances does not appear to be possible at significantly lower temperatures. The present invention in one aspect provides a means for removing unwanted contaminants or by-products from oily streams by the agency of an ancillary distilling agent which lowers the boiling temperatures of the contaminants by combining with them in a true, molecular level solution in the liquid state; such liquid state being accomplished by mixing the oily substance in a mixer or contactor vessel at high temperature and pressure with the ancillary agent in the gaseous state at substantially the same pressure and slightly higher temperature in a manner which causes the aforesaid ancillary agent to condense and form a true solution in the oily liquid. The invention in another aspect provides apparatus for carrying out the method of the invention, comprising the means for supplying the material to be treated to the mixer or contact vessel through a pressurizing pump, a heater, and the necessary piping at a pressure of 50 atmospheres (atm) or 735 pounds per square inch (psi) and at a temperature of about 250° C, and means for supplying the ancillary distilling agent to the mixer or contact vessel through a pressurizing pump, a vapourizer and any necessary a pipe at a pressure of about 50 atm (735 psi) and at a temperature of about 270° C, and wherein the mixer is followed by an expander.

It is thus possible to reduce the length of time at which the material to be treated is subjected to high temperature to a few seconds, without simultaneous reduction in the degree of purification or separation, and with a lower cost of apparatus than other techniques.

The aforesaid time of a few seconds is the maximum residence time of the oily stream in the system between the mixer and the expander outlet and includes heating time, mixing with the ancillary distilling agent, the transformation of the ancillary agent from gaseous to liquid phase, the subsequent flash distillation of the ancillary agent and the dissolved contaminants when the pressure is reduced in the expander wherein the distillation process leads to a cooling of the oily stream from 250° C to 230° C or from 242° C to 212° C depending on the initial concentration of ancillary distilling agent in the stream.

As regards the cost of the apparatus for carrying out the method, the very expensive heating surfaces for the oily stream to be treated are made smaller, while the heating surfaces for the ancillary distilling agent which are much simpler to produce and correspondingly cheaper are made somewhat larger.

The invention will be further described, by way of example only, with reference to the accompanying drawing, which is a schematic side view, partly cut away, of a stripping installation.

The material that is to be separated from impurities, e.g. a vegetable oil, is introduced through a pipe inlet 1, brought to a pressure of some 50 atm by a pressurizing pump 2, and then passed through a pipe 3 into a heater 4, where it is heated to about 220° C, and passed through a pipe 5 into a mixer or contactor 6.

An ancillary distilling agent, e.g. water, which may already be in the form of steam, is introduced through an inlet 7, brought to a pressure of some 50 atm by pressurizing pump 8, and then passed through a pipe 9 into a vapourizer or heater 10, so that the steam finally enters the contact vessel 6 under a pressure of about 50 atm and a temperature of 270° C.

The temperature of the material under treatment is always adjusted so that the distilling agent entering the mixer vessel 6 in the gaseous phase, in the present case steam, is shock condensed and dissolved in the liquid phase, in which the intimate mixing at the molecular level takes place at a mixing temperature of for example 242° C and at a pressure of about 50 atm.

The mixture then passes in a matter of seconds into an expander 12, and is there shock decompressed or rapidly reduced in pressure down to a subatmospheric pressure of about 1 to 30 torr (0.02–0.60 psi), the treated material quickly cooling, since both the distilling agent and the separated impurities obtain their heats of vapourization from the treated material.

Thus the oily material will then reach a temperature some 30° C below its temperature in mixer or contactor vessel 6, and will be at above 200° C, for example at 212° C.

The material is further transported through a pipe 14 into a separator 15, and minor heating may take place in a heat exchanger 13 if the cooling in the spontaneous decompression has brought the temperature too low.

The distilling agent with such impurities substances as it may have vaporized are present in the separator in the vapor phase, while the treated oil stream is present as a liquid.

The fully processed oil leaves the separator through a pipe 23 and a pump 24, and leaves the installation through an outlet 25. To prevent reabsorption of impurities by the oil, it is blown with a suitable ancillary distilling agent or blocking vapor through the sparger 17 with the agent being introduced through pipe 16.

The total volume of distilling agent together with the impurities is drawn off by an ejector or thermo-compressor 19 through a pipe 18, and passed through a connection 20 into a barometric condenser 21, whence, after condensation, the distilling agent with the impurities can be withdrawn through an outlet 22.

I claim:

1. A method of spontaneously distilling off unwanted by-products from vegetable oils, by means of superheated steam which is utilized to lower the boiling points of the by-products to be removed, the method comprising introducing said steam into a contact vessel containing said oils at a high mixing temperature and pressure, said steam being substantially at the same pressure and at somewhat higher temperature than said oils, such that said stream shock condenses upon entering said contact vessel and dissolves in said oils, forming a true, molecular solution therewith, and then suddenly reducing the pressure of said solution thereby causing said steam, with said by-products, to be stripped from said solution in a vapor state.

2. The method of claim 1, wherein the steam is introduced into the contact vessel at a temperature of about 270° C.

3. The method of claim 1, wherein the mixing temperature is about 250° C, and the pressure in the contact vessel is about 50 atmospheres.

4. The method of claim 1, wherein the mixing temperature is 242° C and the pressure in the contact vessel is about 50 atmos.

5. A method as claimed in claim 1, wherein about 3% by weight of the steam per unit weight of the vegetable oils is supplied to the contact vessel.

* * * * *